United States Patent Office 2,703,794
Patented Mar. 8, 1955

2,703,794

ETHYLENE/VINYL ACETATE POLYMERIZATION PROCESS

Milton J. Roedel, Wilmington, Del., assignor to E. I. du Pont de Nemours and Company, Wilmington, Del., a corporation of Delaware No Drawing. Application September 4, 1951, Serial No. 245,079

4 Claims. (Cl. 260—87.3)

This invention relates to a process of preparing copolymers of ethylene and vinyl acetate and more particularly is directed to a low temperature, highly efficient process for emulsion copolymerization of ethylene and vinyl acetate that yields ethylene/vinyl acetate copolymer latices that can be hydrolyzed to high molecular weight ethylene/vinyl alcohol copolymers. This application is a continuation-in-part of my copending application S. N. 199,143, filed December 4, 1950, which in turn is a continuation-in-part of my copending application S. N. 98,197, filed June 10, 1949.

The copolymerization of ethylene with vinyl acetate was first described by M. W. Perrin and was covered in the United States by his U. S. Patent 2,200,429. A number of contemporary investigators have described the copolymers and provided new catalysts, reaction media and methods of forming the polymers and improving their properties. The hydrolysis or partial hydrolysis of said polymers to ethylene/vinyl alcohol compolymers is covered in U. S. Patents 2,386,347 and 2,399,653. However, in spite of the extensive art, no commercially feasible process has been developed for ethylene/vinyl acetate copolymers because the high polymerization temperatures required by the prior art to introduce ethylene, at commercially feasible rates, on a continuous process basis lead to extensive branching of the copolymer, which is particularly reflected by marked degradation in molecular weight on hydrolysis, giving low molecular weight ethylene/vinyl alcohol copolymers of insufficient toughness for wide utility in the plastics field.

An object of this invention is to provide a process by which improved copolymers of ethylene and vinyl acetate can be produced. Another object is to provide an efficient low temperature process for the emulsion copolymerization of ethylene and vinyl acetate by use of a reduction-oxidation catalyst. Another object is to provide a versatile low temperature emulsion process by means of which the combining ratio of ethylene and vinyl acetate can be varied widely by choice of reaction conditions. Another object is to provide a medium in which improved copolymers of ethylene and vinyl acetate can be produced. A still further object is to provide a process for the production of high molecular weight copolymers of ethylene and vinyl acetate in the form of a latex for use as such or which can be hydrolyzed to high molecular weight ethylene/vinyl alcohol copolymers. Other objects and advantages of the invention will appear hereinafter.

High molecular weight ethylene/vinyl acetate copolymers, having desirable molecular structures and hydrolyzable to high molecular weight orientable ethylene/vinyl alcohol copolymers, are produced in accord with the process of this invention by polymerizing ethylene and vinyl acetate together in the presence of a reducing agent and an oxidizing agent capable of generating a free radical by a reduction-oxidation process known as a redox process. This copolymerization reaction is conducted in an aqueous emulsion of the reactants to give an aqueous dispersion of the copolymer. The redox emulsion copolymerization process may be conducted at temperatures from as low as −50° C. up to 125° C., at pressures ranging from 10 to 3000 atmospheres or higher. For optimum operation, however, and for the production of superior copolymers, temperatures between 30° and 90° C. should be employed and pressures between 50 and 1500 atmospheres.

The composite reduction-oxidation catalyst employed in the reaction constitutes a mixture of organic and/or inorganic compounds that produce a free radical as needed to copolymerize the ethylene and the vinyl acetate. The free radical produced by the reduction-oxidation reaction, which occurs along with the copolymerization reaction, may be formed from a peroxygen compound including those well known to the art as suitable for polymerizing ethylene and for producing copolymers of ethylene/vinyl acetate, while the reducing agent may be a metal salt of groups I–B and VIII of the periodic table, or heavy metal ions generally which exist in more than one valence state. Contrariwise, the reducing agent may be an organic compound such, for example, as sodium formaldehyde sulfoxylate, ascorbic acid or the like. In addition to the use of a reduction-oxidation catalyst, efficient production of the copolymer necessitates conducting the copolymerization while the reactants are in an emulsified or disposed phase. When the copolymerization is conducted in this manner the conversion of ethylene and vinyl acetate to copolymers is increased several fold over that obtained without an emulsified or dispersed state being present.

An additional feature of the invention, the use of which provides optimum operation of the process resulting in increased introduction of ethylene into the copolymer at a given pressure, involves a reaction in which the copolymerization, in addition to being conducted in a redox catalyst system and in the presence of an aqueous emulsion or dispersion, is likewise carried out in the presence of tertiary butyl alcohol.

The examples illustrate preferred embodiments of the invention in which parts are by weight unless otherwise described.

*Example 1.*—The following materials were added to a on liter stainless steel rocker tube at 0° C. under a stream of nitrogen:

280 ml. deoxygenated water+3 gm. $Na_2HPO_4$+10 gm. "Duponol" ME (the sodium salt of sulfated lauryl alcohol).
20 ml. deoxygenated water containing dissolved therein 0.14 gm. $FeSO_4.7H_2O$+0.23 gm. $Na_4P_2O_7.10H_2O$.
0.54 gm. $K_2S_2O_8$ in a small unstoppered vial.
0.21 gm. $NaHSO_3$ in a small unstoppered vial.
100 ml. vinyl acetate.

The rocker tube was then evacuated and pressured to 400 atmospheres with ethylene containing less than 10 p. p. m. oxygen. The rocker was then started, mixing the contents of the vials and emulsifying the monomer and the temperature brought to 30° C. and the pressure to 1000 atmospheres with ethylene. After two hours' reaction time and a pressure drop of 120 atmospheres, the rocker contents were discharged in the form of a latex which was coagulated with brine solution. The ethylene/vinyl acetate copolymer was washed with water and dried on hot mill rolls. There was thus obtained 66 gm. of tough, high molecular weight, colorless polymer which analyzed 1.2 moles of combined ethylene per mole of combined vinyl acetate and possessed a melt flow point of 165° C. on a melting point determination block.

*Example 2.*—The following materials were added to a one liter stainless steel rocker tube at 0° C. under a stream of nitrogen:

200 ml. deoxidized water+10 gm. "Duponol" Me+0.31 gm. sodium formaldehyde sulfoxylate dihydrate.
100 ml. vinyl acetate+0.26 gm. cyclohexanone peroxide.

The rocker tube was then evacuated and pressured to 400 atmospheres with ethylene containing less than 10 p. p. m. oxygen. The rocker was then started and the temperature brought to 30° C. and the pressure to 1000 atmospheres with ethylene. After two hours' reaction time the product was recovered as a latex containing 67 gm. of ethylene/vinyl acetate copolymer containing 7.2 moles of combined ethylene per mole of combined vinyl acetate or six times as much combined ethylene per mole of combined vinyl acetate as Example 1.

*Example 3.*—Same charge and procedure as Example 2 except run at 400 atmospheres instead of 1000 atmospheres pressure. Yield equaled 41 gm. of ethylene/vinyl acetate copolymer containing 3.2 moles of combined ethylene per mole of combined vinyl acetate. Despite the relatively low pressure used, this product was tough in film form and possessed the high melt flow temperature of 150° C.

*Example 4.*—Same procedure as Example 2 with 15 ml. of "Alkanol" WXN (a sodium sulfonate of white oil) replacing the "Duponol" ME. In this case 64 gm. of ethylene/vinyl acetate copolymer was obtained which contained 1.45 moles of combined ethylene per mole of combined vinyl acetate, which is ⅓ as much combined ethylene per mole of combined vinyl acetate as Example 2.

*Example 5.*—Same procedure as Example 2 with 10 ml. of "Triton" N–100, a nonionic dispersing agent derived from ethylene oxide and a substituted phenol, replacing the "Duponol" ME. Yield equaled 14 gm. of ethylene/vinyl acetate copolymer containing 1.28 moles of combined ethylene per mole of combined vinyl acetate.

*Example 6.*—The following materials were added to a one liter stainless steel rocker tube at 0° C. under a stream of nitrogen:

220 ml. deoxygenated water+10 gm. "Duponol" ME+20 ml. deoxidized water containing 0.14 gm. $FeSO_4.7H_2O$+0.23 gm. $Na_4P_2O_7.10H_2O$
60 ml. deoxidized tertiary butyl alcohol.
0.31 gm. l-ascorbic acid in small unstoppered vial.
0.26 gm. cyclohexanone peroxide in small unstoppered vial.
50 ml. vinyl acetate.

The rocker tube was then evacuated and pressured to 400 atmospheres with ethylene. The rocker was then started and the temperature brought to 30° C. and the pressure to 1000 atmospheres for a two hour period. There was obtained 43 gm. of tough copolymer containing 14.2 moles of combined ethylene per mole of combined vinyl acetate, which demonstrates the marked effect that tertiary butyl alcohol has on the combining power of the monomers. The use of other water soluble solvents such as acetone, methanol, ethanol, isopropyl alcohol and isopropyl acetate were not effective adjuvants since they reduced the molecular weight of the copolymer. This effect is shown in the following table.

*Table I*

| Ml. Tert.-butyl alcohol [1] | Ml. Water | Ethylene Pressure, Atms. | Ethylene/Vinyl Acetate ratio in Copolymer | Yield (gm.) |
| --- | --- | --- | --- | --- |
| None | 280 | 1,000 | 14.5 | 37.0 |
| 50 | 230 | 1,000 | 32.4 | 27.0 |
| None | 280 | 600 | 9.2 | 15.0 |
| 50 | 230 | 600 | 16.0 | 27.0 |

[1] All runs carried out in a one liter stainless steel rocker tube at 30° C. with the common charge of 20 ml. vinyl acetate, 10 gm. "Duponol" ME, 0.26 g. cyclohexanone peroxide and 0.31 gm. sodium formaldehyde sulfoxylate dihydrate.

*Example 7.*—Into a one gallon stainless steel autoclave, equipped with a low speed anchor type agitator, were fed the following feed streams, at approximately room temperature, at the pumping rates indicated:

*Feed stream #1.*—Sixteen pounds per hour of solution was pumped, which was composed of:

6 parts by weight of the dispersing agent "Alkanol" WXN.
2 parts by weight of monobasic potassium hydrogen phosphate.
92 parts by weight of deoxygenated water.
334 p. p. m. of potassium persulfate.

The pH of this feed stream was adjusted to 4.55 with phosphoric acid.

*Feed stream #2.*—8.2 pounds per hour of deoxygenated ethylene and 8.8 pounds per hour of inhibitor-free deoxygenated vinyl acetate.

*Feed stream #3.*—206 ml. per hour of a solution of 0.00628 gram of sodium formaldehyde sulfoxylate dihydrate per ml. of aqueous solution.

The autoclave temperature was adjusted to 82° C. and the autoclave pressure adjusted to 900 atmospheres. After the autoclave was operated at the above mentioned conditions of temperature and pressure for a two hour period, sufficient to approach an equilibrium condition of reactants and products inside the autoclave plus an interval of time sufficient to sweep the reactor of 90% of the initial copolymer formed under non-steady state conditions, the copolymer was continuously collected in the form of a latex containing 11.5% total solids. This latex was coagulated with brine solution and the ethylene/vinyl acetate copolymer was washed with water and dried on hot mill rolls. There was thus obtained a tough, colorless polymer which analyzed 2.46 moles of combined ethylene per mole of combined vinyl acetate.

The following table demonstrates data obtained in the stirred autoclave by varying the polymerization temperature by proper choice of catalyst. The reaction is exothermic and the temperature was maintained constant by introduction of the feed streams at room temperature and measuring the temperature achieved under steady state conditions. It will be noted that not until the polymerization temperature was lowered below 107° C. was high molecular product obtained on hydrolysis with an inherent viscosity greater than 0.70, which is required for orientability and hence adequate toughness properties. This is thought to be due to the marked chain transfer properties of vinyl acetate monomer as well as the vinyl acetate polymer unit. Hence it is essential to work at temperatures below 100° C. in order to achieve a high molecular weight ethylene/vinyl acetate copolymer which will yield a tough, orientable ethylene/vinyl alcohol copolymer on hydrolysis. Heretofore no effective catalyst systems were known which could be operated at low temperatures, at appreciable polymerization rates in a continuous system when sufficient ethylene was present to give products containing at least 50 mole percent ethylene. Hence the present invention permits the ready synthesis, under economic conditions, of high molecular weight ethylene/vinyl acetate copolymers and the corresponding hydrolyzed high molecular weight, orientable ethylene/vinyl alcohol copolymers for use as fibers, films, molded articles, safety glass interlayers and like plastic outlets.

*Table II*

| Temp.[1] (° C.) | Pressure (Atms.) | Ethylene/Vinyl Acetate Mole Ratio | Inherent Viscosity [2] of hydrolyzed Ethylene/Vinyl Acetate Copolymer | Orientability |
| --- | --- | --- | --- | --- |
| 139 (a) | 900 | 3.6 | 0.25 | None. |
| 129 (a) | 600 | 3.1 | 0.44 | None. |
| 107 (b) | 900 | 2.75 | 0.62 | Poor. |
| 82 (c) | 600 | 2.46 | 0.87 | Excel. |
| 77 (c) | 900 | 2.50 | 0.94 | Excel. |
| 60 (c) | 400 | 1.70 | 0.85 | Excel. |

[1] All runs carried out in 1 gal. stainless steel autoclave under constant environment conditions.
(a) Catalyst system: potassium persulfate—no reducing agent.
(b) Catalyst system: potassium persulfate—l-ascorbic acid.
(c) Catalyst system: potassium persulfate—sodium formaldehyde sulfoxylate dihydrate.
[2] Determined as an 0.50 percent solution in meta cresol at 25° C.

The heavy metal reducing agents, other than iron of the examples, used in conjunction with the free radical producing compounds, include the polyvalent heavy metal ions and more especially the ions from the heavy metals of the third period of the "periodic system," as arranged in Hackh's "Chemical Dictionary" of 1937, page 695 and including titanium, vanadium, chromium, manganese, iron, cobalt, nickel, and copper and combinations thereof. Silver is likewise suitable. Silver, while not a polyvalent metal, appears to act like one for it is an effective catalyst for the reaction when used in the presence of an oxidizing agent. The preferred heavy metals are iron, silver, nickel and cobalt. The metal ion may be introduced in the lower state of oxidation or reduced in situ by a supplementary reducing agent. During the course of the reaction, the metal ion is oxidized and may be again reduced by the supplementary reducing agent. In general, it is preferred to use the ferrous ions because iron compounds are cheap and readily available. As supplementary reducing agents which may be used with, or in place of, the heavy metal ions, one may use such compounds as sulfinic acids, benzoin, l-ascorbic acid, primary, secondary, tertiary and polyamines, sodium or zinc formaldehyde sulfoxylate and alkanolamines, such as triethanolamine and like reducing compounds.

Examples of suitable oxidizing agents include the peroxygen compounds for use in forming such active free radicals, the salts of hydrogen peroxides, perborates, percarbonates, persulfates, perphosphates, percarboxylates; organic hydroperoxides such as methyl hydroperoxide, ethyl hydroperoxide, tertiary butyl hydroperoxide, tetralin hydroperoxide, cumene hydroperoxide, cyclohexane hydroperoxide, cyclohexanone peroxide, diacyl peroxides, such as benzoyl peroxide, acetyl peroxide, acetyl benzoyl peroxide, lauroyl peroxide, crotonyl peroxide, etc.; alkyl acyl peroxides such as tertiary butyl perbenzoate, ditertiary butyl perphthalate, tertiary butyl permaleic acid, tertiary butyl perphthalic acid, hydrogen peroxide, peracetic acid, perbenzoic acid, diisobutylene ozonide, methyl ethyl ketone peroxide, acetone methyl isobutyl ketone peroxide, succinic acid peroxide, methyl isobutyl ketone peroxide, polyperoxides, diethyl peroxydicarbonate, pelargonyl peroxide and like materials. Amounts used are in the range of 0.005 to 3% by weight based on monomer.

The amount of heavy metal ion added to the polymerization mixture can be markedly lowered by the addition of an organic reducing agent which possesses the ability to reduce the -ic ion to the -ous ion thus renewing the supply of -ous ion when the -ous ion is oxidized to the -ic ion by the peroxy compound. Under these conditions the amount of ferrous ion present, for example, is preferably in the range of 0.1–1000 parts per million based on the total amount of polymerizable monomer present. The heavy metal ion can also be obtained by introduction of a simple or complex salt or compound in which the metal is present in the -ic state provided that a suitable reducing agent is present to reduce the -ic to the -ous ion. Examples of such reducing agents are manifold and include such compounds as l-ascorbic acid, d-ascorbic acid, sodium formaldehyde sulfoxylate, dihydroxy maleic acid, formamidine sulfinic acid, butyraldehyde, sorbose, fructose and glucose. These reducing agents are generally used in ammounts of 0.005 to 3% based on the total amount of monomers present, preferably 0.01 to 1%.

The outstanding characteristic of the process hereinbefore described is that it produces copolymers of ethylene and vinyl acetate of improved molecular structure by an economical process, which copolymers can be hydrolyzed to high molecular weight ethylene/vinyl alcohol copolymers for use in fibers, films and molded articles. Moreover, more latitude in the control of operating conditions is permitted when the redox system is used, since varying ratios of ethylene can be readily introduced into the copolymer depending upon the choice of redox catalyst, emulsifying agent and amount of tertiary butyl alcohol used. The properties of the redox-produced ethylene/vinyl acetate copolymer latex are also of value alone or in conjunction with other polymeric materials, waxes, pigments, dyes and like adjuvants for impregnating and coating uses similar to synthetic rubber latices. In particular these latices on evaporation at room temperatures produce a continuous, flexible film of utility for decorative water paints, protective coatings, adhesives, and like uses.

The copolymerization is carried out in aqueous emulsions for in such systems the copolymers of ethylene and vinyl acetate are produced in superior yields. The reaction in such a system is carried out in the presence of from 0.5 to 10 parts of water and preferably in the presence of from 1 to 5 parts by weight of water per part by weight of ethylene and vinyl acetate present. In this reaction also there is employed from 0.001 to 0.10 part of an emulsifying, wetting or dispersing agent per part of water present.

As emulsifying or dispersing agents such materials can be used as the potassium or sodium salts of long chain sulfates or sulfonates, ammonium salts of perfluorocarboxylates containing 7 to 11 carbon atoms, neutral agents such as the polyethylene oxide condensates, quaternary ammonium salts, such as cetyl trimethyl ammonium bromide, as well as other emulsifying and dispersing agents common to the art. The pH may be varied within wide limits depending upon the systems used although most systems yield the highest conversions when carried out at a pH between 4 and 10.

The use of the water soluble organic solvent, tertiary butyl alcohol, which can be employed in amounts between 0.05 and 1 part and preferably in amounts between 0.1 and 0.5 part by weight per part of water, markedly increases the combining power of the ethylene so that much lower ethylene pressures can be used to obtain a given ratio of combined ethylene to combined vinyl acetate in the copolymer. In general the most useful ratios have been found to be 1 to 30 moles of combined ethylene per mole of combined vinyl acetate. In particular the 3/1 mole ratio ethylene/vinyl acetate copolymer on hydrolysis yields a hydroxylated polymer possessing an outstanding combination of properties for molded article usage, such as extreme toughness, clarity and excellent outdoor durability properties. Similar properties are obtainde when other vinyl esters are used in place of vinyl acetate, such as vinyl formate, vinyl propionate and vinyl benzoate.

Likewise other polymerizable monomers can be added as third components in minor amounts to the ethylene/vinyl acetate systems disclosed herein, such as carbon monoxide, maleic anhydride, allyl glycidyl ether, methyl hydrogen maleate, maleimide, sulfur dioxide, vinyl chloride and acrylate and methacrylate esters.

The copolymerization reaction may be carried out batchwise, semi-continuously or continuously. It is particularly well adapted for continuous polymerization in either an autoclave or a tubular reactor. Agitation may be provided by the use of stirring devices in an autoclave, by jet agitation or by shaking machines (in batchwise reactions) or by providing turbulent flow in tubular reactors having a high ratio of length to cross-section.

Partial or complete hydrolysis of the ethylene/vinyl acetate copolymers of this invention can be readily achieved by methods common to the art, such as disclosed in U. S. Patents 2,386,347 and 2,399,653. For example, the copolymer can be readily transferred from the latex to a water immiscible solvent, such as n-butyl alcohol, benzene, toluene or xylene, by dispersing the latter in the latex and then breaking the emulsion, decanting the organic solution, drying to remove traces of water and carrying out an alcoholysis by addition of sodium methoxide and an alcohol such as methanol. The ethylene/vinyl alcohol copolymer is then isolated by a steam strike, the copolymer filtered off, washed, dried and compacted by means of an extruder. Alternatively, the addition of excess alkali, such as sodium hydroxide and methanol, to the ethylene/vinyl acetate latex gives a fine solids dispersion which is readily saponified on heating to ethylene/vinyl alcohol copolymer, which is filtered off, washed well with water to remove sodium acetate, dried and compacted. Likewise ethylene/vinyl acetate copolymer in fiber or thin film form can be saponified by alkali in methanol to give continuous fibers or films of ethylene/vinyl alclohol copolymers.

I claim:

1. The process of claim 3 in which 0.1 to 1000 parts per million of ferrous ion is present per part of water.

2. The process of claim 3 in which there is present from 0.5 to 10 parts of water per part by weight of ethylene and vinyl acetate and from 0.001 to 0.10 part by weight of an emulsifying agent per part of water.

3. In a low temperature continuous process for the preparation of copolymers of ethylene and vinyl acetate containing 1 to 30 moles of ethylene per mole of vinyl acetate, the steps which comprise continuously introducing into a reaction zone ethylene and vinyl acetate in a ratio of 1 to 30 moles of ethylene per mole of vinyl acetate, 0.5 to 10 parts of water per part by weight of ethylene and vinyl acetate, from 0.1 to 0.5 part by weight of tertiary butyl alcohol per part by weight of water, an emulsifying agent and a peroxygen compound acting conjointly with a reducing agent capable of generating free radicals in situ, maintaining the reaction conditions in said zone substantially constant at a temperature between 30° C. and 90° C. and at a pressure between 50 and 1500 atmospheres and continuously withdrawing the copolymer produced from the reaction zone.

4. In a low temperature continuous process for the preparation of copolymers of ethylene and vinyl acetate containing 1 to 30 moles of ethylene per mole of vinyl acetate, the steps which comprise continuously introducing into a reaction zone ethylene and vinyl acetate in a ratio of 1 to 30 moles of ethylene per mole of vinyl acetate, 0.5 to 10 parts of water per part by weight of ethylene and vinyl acetate, from 0.1 to 0.5 part by weight of tertiary butyl alcohol per part by weight of water, an emulsifying agent, sodium formaldehyde sulfoxylate, and a peroxygen compound that provides a persulfate ion, maintaining the reaction conditions in said zone substantially constant at a temperature between 30° C. and 90° C. and at a pressure between 50 and 1500 atmospheres, and withdrawing continuously the copolymer from the reaction zone.

References Cited in the file of this patent

UNITED STATES PATENTS

| | | |
|---|---|---|
| 2,380,473 | Stewart | July 31, 1945 |
| 2,436,256 | Hanford et al. | Feb. 17, 1948 |

FOREIGN PATENTS

| | | |
|---|---|---|
| 582,093 | Great Britain | Nov. 5, 1946 |